(12) United States Patent
Girard et al.

(10) Patent No.: US 12,306,455 B2
(45) Date of Patent: May 20, 2025

(54) MULTIAXIAL THERMAL DISSIPATION AND STRUCTURALLY-COMPLIANT DEVICE

(71) Applicant: Raytheon Company, Waltham, MA (US)

(72) Inventors: Adam R. Girard, Blue Ridge, TX (US); James A. Aranda, McKinney, TX (US); Gabriel A. Payan, McKinney, TX (US); John M. Chesser, McKinney, TX (US); Ly Dinh Nguyen, College Station, TX (US)

(73) Assignee: Raytheon Company, Arlington, VA (US)

( * ) Notice: Subject to any disclaimer, the term of this patent is extended or adjusted under 35 U.S.C. 154(b) by 213 days.

(21) Appl. No.: 18/313,966

(22) Filed: May 8, 2023

(65) Prior Publication Data

US 2024/0103245 A1    Mar. 28, 2024

Related U.S. Application Data

(63) Continuation-in-part of application No. 17/933,014, filed on Sep. 16, 2022.

(Continued)

(51) Int. Cl.
*G02B 7/00* (2021.01)
*F17C 13/00* (2006.01)

(52) U.S. Cl.
CPC ............ *G02B 7/008* (2013.01); *F17C 13/006* (2013.01); *F17C 2227/0383* (2013.01); *F17C 2227/0397* (2013.01); *F17C 2270/0509* (2013.01)

(58) Field of Classification Search
CPC ................. G02B 7/008; F17C 13/006; F17C 2227/0383; F17C 2227/0397; F17C 2270/0509
See application file for complete search history.

(56) References Cited

U.S. PATENT DOCUMENTS 11,662,063 B2 * 5/2023 Bollinger .............. F17C 13/026
220/212
2019/0063688 A1    2/2019 McCormick
(Continued)

FOREIGN PATENT DOCUMENTS

EP    0762173 A2    3/1997

OTHER PUBLICATIONS

Notice of Allowance dated Nov. 5, 2024 in connection with U.S. Appl. No. 17/933,014, 11 pages.

*Primary Examiner* — Dani Fox
*Assistant Examiner* — Fani Polyzos Boosalis

(57) ABSTRACT

An apparatus includes a Dewar having an endcap. The apparatus also includes a heat sink and a multiaxial thermal shoe having a thermal interface material and configured to thermally couple the endcap of the Dewar to the heat sink via one of at least two axial surfaces. The multiaxial thermal shoe is configured to transfer thermal energy between the endcap of the Dewar and the heat sink without structurally coupling the Dewar to the heat sink. The multiaxial thermal shoe may be configured to hold the thermal interface material against the endcap. The multiaxial thermal shoe may couple to the heat sink via a first axial surface in-line with an optical centerline or a second axial surface crosswise to the optical centerline.

20 Claims, 15 Drawing Sheets

Related U.S. Application Data

(60) Provisional application No. 63/252,512, filed on Oct. 5, 2021.

(56) References Cited

U.S. PATENT DOCUMENTS

| | | |
|---|---|---|
| 2021/0310720 A1 | 10/2021 | Givens |
| 2022/0363043 A1 | 11/2022 | Marceneiro et al. |
| 2022/0364793 A1 | 11/2022 | Chen et al. |
| 2022/0369499 A1 | 11/2022 | Goto et al. |
| 2023/0109525 A1 | 4/2023 | Girard et al. |

* cited by examiner

MULTIAXIAL THERMAL DISSIPATION AND STRUCTURALLY-COMPLIANT DEVICE

CROSS-REFERENCE TO RELATED APPLICATION AND PRIORITY CLAIM

This application claims priority under 35 U.S.C. § 120 as a continuation-in-part of U.S. patent application Ser. No. 17/933,014 filed on Sep. 16, 2022, which claims priority under 35 U.S.C. § 119(e) to U.S. Provisional Patent Application No. 63/252,512 filed on Oct. 5, 2021. Both of these applications are hereby incorporated by reference in their entirety.

TECHNICAL FIELD

This disclosure is generally directed to thermal management systems. More specifically, this disclosure is directed to an integrated Dewar assembly with a multiaxial thermal dissipation assembly.

BACKGROUND

Infrared detectors and other imaging devices or other devices often need to be cooled to extremely low temperatures in order to enable effective operations of the devices. For example, an infrared detector may need to be cooled to approximately 77 Kelvin (about −321° F.) for effective operation. An infrared detector or other device to be cooled is often placed within a Dewar, which refers to a vessel or other structure that can be evacuated by removing air from the structure. The Dewar can then be cooled, such as by using a cryogenic cooler, in order to cool the infrared detector or other device within the Dewar. The removal of air from the Dewar helps to avoid conductive heat transfer within the Dewar.

SUMMARY

This disclosure is directed to an integrated Dewar assembly with a multiaxial thermal dissipation assembly.

In a first embodiment, an apparatus includes a Dewar having an endcap. The apparatus also includes a heat sink and a multiaxial thermal shoe having a thermal interface material and configured to thermally couple the endcap of the Dewar to the heat sink via one of at least two axial surfaces. The multiaxial thermal shoe is configured to transfer thermal energy between the endcap of the Dewar and the heat sink without structurally coupling the Dewar to the heat sink.

In a second embodiment, a method includes obtaining a Dewar having an endcap and obtaining a multiaxial thermal shoe. The method also includes obtaining a heat sink and coupling the heat sink to the multiaxial thermal shoe via one of at least two axial surfaces. The method further includes placing a thermal interface material between the endcap and multiaxial shoe to thermally couple the endcap of the Dewar to the heat sink. The multiaxial thermal shoe is configured to transfer thermal energy between the endcap of the Dewar and the heat sink without structurally coupling the Dewar to the heat sink.

In a third embodiment, a method includes removing thermal energy from a Dewar having an endcap. The method also includes passing the thermal energy through a thermal interface material and a multiaxial thermal shoe. The method further includes providing the thermal energy to a heat sink. The multiaxial thermal shoe thermally couples the endcap of the Dewar to the heat sink via one of at least two axial surfaces and transfers thermal energy between the endcap of the Dewar and the heat sink without structurally coupling the Dewar to the heat sink.

Other technical features may be readily apparent to one skilled in the art from the following figures, descriptions, and claims.

BRIEF DESCRIPTION OF THE DRAWINGS

For a more complete understanding of this disclosure, reference is now made to the following description, taken in conjunction with the accompanying drawings, in which.

DETAILED DESCRIPTION

Figure 1:
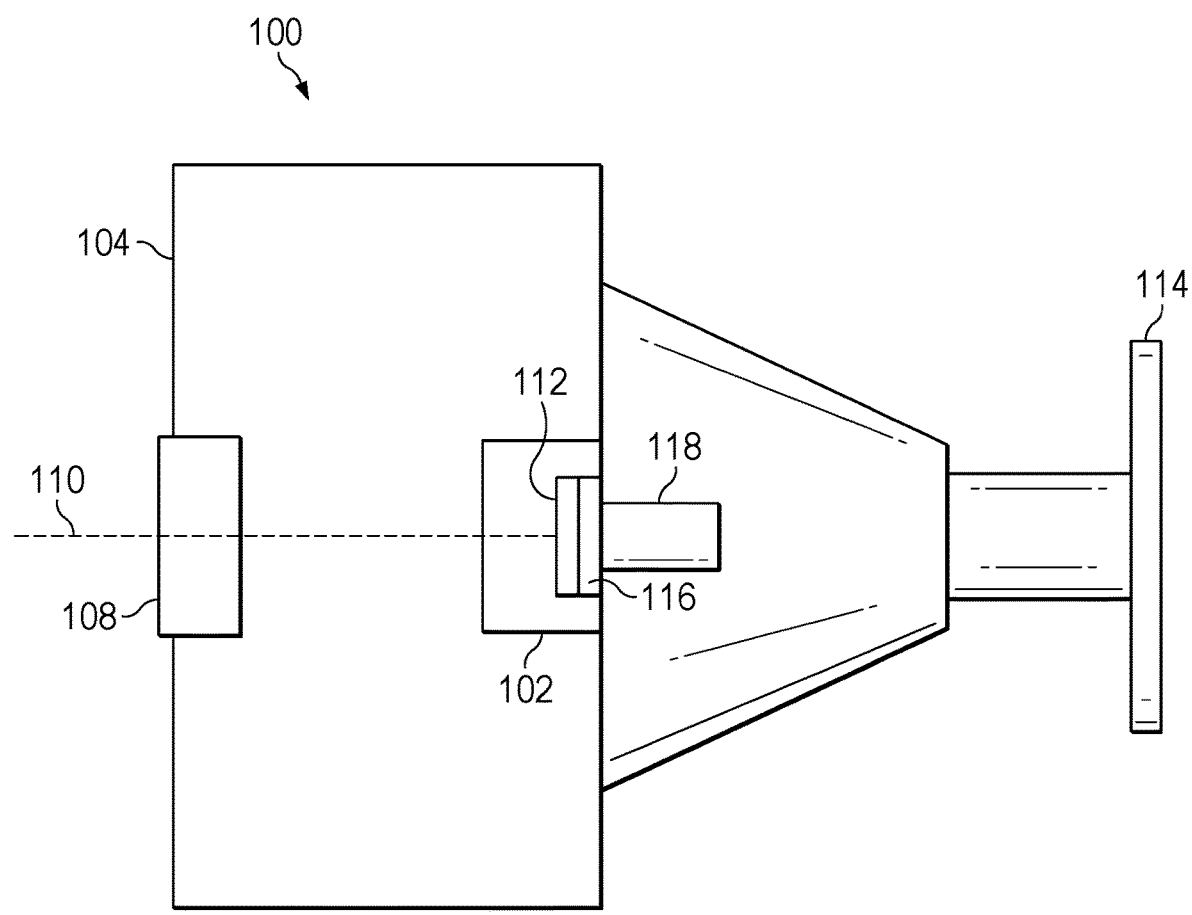
FIG. 1 illustrates an example Dewar system utilizing a cold shield according to this disclosure.

FIGS. 1 through 6, described below, and the various embodiments used to describe the principles of the present disclosure are by way of illustration only and should not be construed in any way to limit the scope of this disclosure. Those skilled in the art will understand that the principles of the present disclosure may be implemented in any type of suitably arranged device or system.

As described above, infrared detectors and other imaging devices or other devices often need to be cooled to extremely low temperatures in order to enable effective operations of the devices. For example, an infrared detector may need to be cooled to approximately 77 Kelvin (about −321° F.) for effective operation. An infrared detector or other device to be cooled is often placed within a Dewar, which refers to a vessel or other structure that can be evacuated by removing air from the structure. The Dewar can then be cooled, such as by using a cryogenic cooler, in order to cool the infrared detector or other device within the Dewar. The removal of air from the Dewar helps to avoid conductive heat transfer within the Dewar.

Some approaches use a compliant heat strap to thermally couple a Dewar assembly to a coldplate, which can be used to remove thermal energy from the Dewar assembly. However, this can lead to the generation of large temperature differentials across the heat strap, and heat straps are often heavy and relatively inefficient. Also, large heat straps formed from copper or other materials can often be relatively expensive. In addition, increasing the mass of a heat strap may provide better thermal conductance, but this also increases the rigidity of the heat strap. In environments where vibrations can be present, this increased rigidity may cause increased jitter on an infrared detector or other device within the Dewar assembly.

Other approaches use one or more heat pipes to thermally couple a Dewar assembly to a coldplate in order to remove thermal energy from the Dewar assembly. However, these approaches typically require that the pipes be vertically oriented to transfer heat from the Dewar assembly to the coldplate. The vertical orientation constraint can limit applications of the Dewar assembly and increase complexity and manufacturing challenges. The heat pipes can also add weight and increase the cost of an overall system. In addition, the heat pipes may provide good thermal conductance but may also introduce a rigidity to a Dewar assembly.

Still other approaches use one or more endcap-mounted fins to provide a cooling source and remove thermal energy from a Dewar assembly. However, endcap-mounted fins are not feasible in high-power applications. Additionally, the endcap-mounted fins can add weight and may require a larger form factor in order to accommodate space for internal fans.

This disclosure provides integrated Dewar assemblies with compliant endcap cooling. As described in more detail below, a Dewar assembly includes a Dewar having an endcap. In some cases, the Dewar can be positioned near one or more optics (such as one or more lenses) or other components for use with an infrared detector or other device(s) within the Dewar. The endcap of the Dewar is physically separated from a coldwall, a coldplate, or other cooling structure (which is referred to generally as a "heat sink") by a gap. The gap can be at least partially filled using a thermal interface material, where the thermal interface material thermally couples the endcap of the Dewar to the heat sink. The thermal interface material can represent a low-stress compliant material that effectively transfers thermal energy from the Dewar to the heat sink but does not structurally couple the Dewar to the heat sink.

The low-stress compliant material can represent material configured to comply with thermal transfer and rigidity requirements for a Dewar-cooled optic system or other system. For example, the low-stress compliant material can be an amorphous pliable material (such as a putty) that remains pliable at a wide range of temperatures. This helps to provide improved thermal energy transfer and improved cooling of the Dewar while reducing or minimizing jitter introduced to the Dewar and the device(s) within the Dewar assembly. In some embodiments, this approach may also be used with a thermal shoe that distributes thermal energy from the Dewar's endcap over a larger area of the heat sink, thereby providing a larger "footprint" on the heat sink. This can be accomplished since the thermal shoe can have (i) a portion associated with the thermal interface material and having a smaller cross-sectional area and (ii) a portion associated with the heat sink and having a larger cross-sectional area.

FIG. 1 illustrates an example Dewar system 100 utilizing a cold shield according to this disclosure. In the example shown in FIG. 1, the Dewar system 100 includes a cold shield 102 coupled to an infrared or other detector 104. The detector 104 includes a lens 108 aligned with an optical path 110, where the optical path 110 is aligned to the one or more infrared or other sensors 112. The lens 108 is configured to provide a directed field of view, via the optical path 110, for the one or more sensors 112. The Dewar system 100 is also coupled to a heat sink 114. The heat sink 114 represents a coldwall, a coldplate, or other cooling structure configured to remove thermal energy from the detector 104.

The cold shield 102 is disposed over or around the sensors 112 and is configured to be cooled and to shield the sensors 112. For example, the cold shield 102 may include a continuous body of copper or other metal(s) that is able to protect the sensors 112 from ambient thermal or infrared radiation. This can be very useful when the detector 104 is or includes a sensor that reacts to infrared radiation. The sensors 112 are disposed on a cold finger 116, which is coupled to an expander 118, where the heat is rejected. Of course, embodiments with other objects requiring protection from unwanted heating by thermal radiation or light could be used. Thus, the cold shield 102 may be used with any other cooled object, such as one having a low absorption and high reflectivity.

Although FIG. 1 illustrates one example of a Dewar system 100 utilizing a cold shield 102, various changes may be made to FIG. 1. For example, the Dewar system 100 is shown in simplified form here and may include any number of additional components in any suitable configuration as needed or desired. Also, each component of the Dewar system 100 may have any suitable size, shape, and dimensions.

Figure 2:
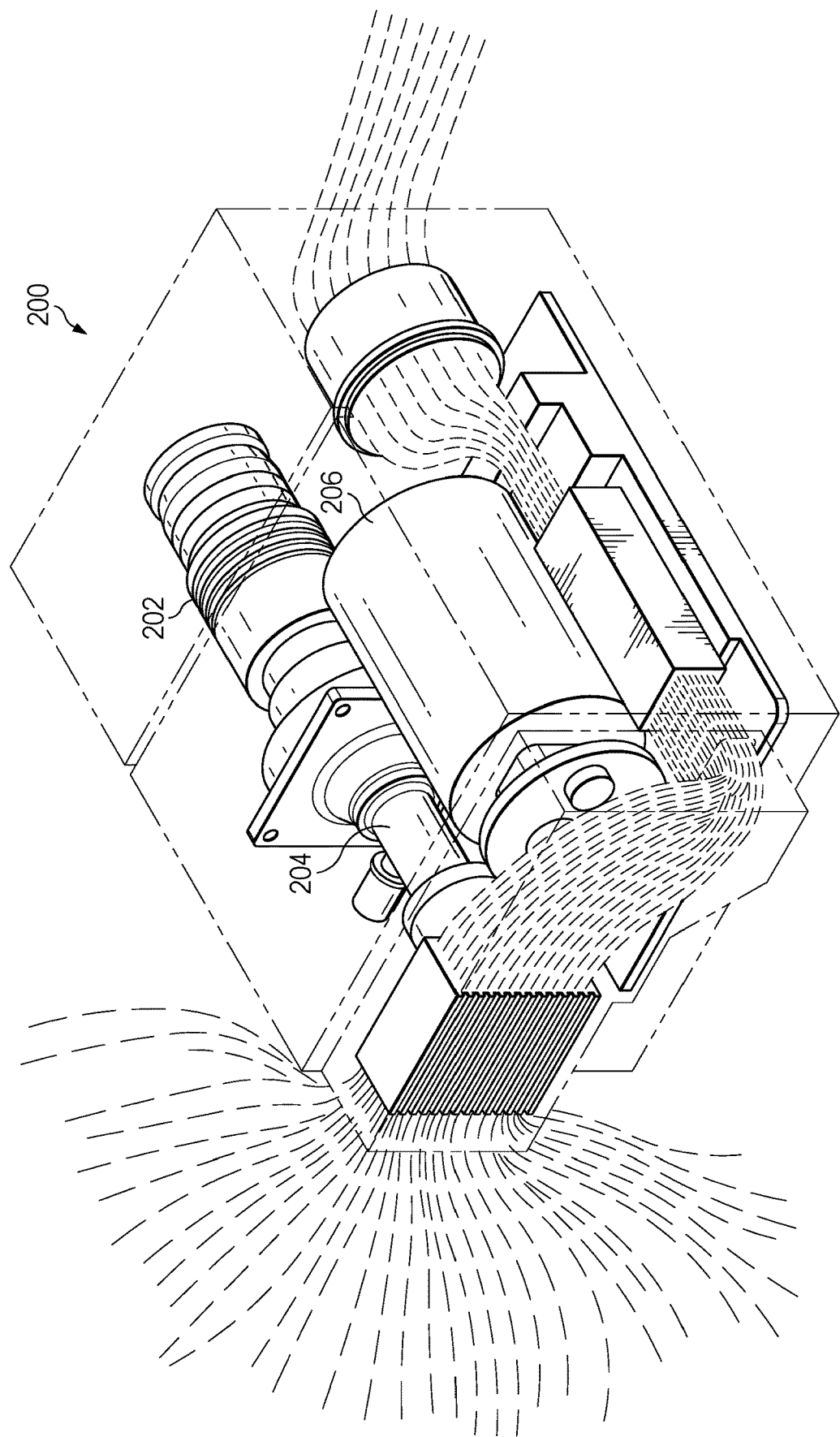
FIG. 2 illustrates an example imaging system including a Dewar according to this disclosure.

FIG. 2 illustrates an example imaging system 200 including a Dewar according to this disclosure. In some embodiments, the imaging system 200 may represent an air-cooled distributed aperture system (DAS), although other implementations of the imaging system 200 may be used here. As shown in FIG. 2, the imaging system 200 includes an optic system 202 coupled to a Dewar 204. Dewar 204 can be the same as, or similar to, Dewar system 100. The optic system 202 includes an image sensor and one or more lenses configured as a lens stack. The imaging system 200 also includes a compressor or cryogenic cooler system 206.

The optic system 202 is configured to capture images via the lens stack and the image sensor. For efficient operation, the image sensor can be cooled or cold. For example, the image sensor in certain systems may be cooled to a temperature around about 85 Kelvin (about −306° F.), while the image sensor in other systems may be cooled to a temperature around about 120 Kelvin (about −244° F.). The compressor or cryogenic cooler system 206 is configured to provide a cooling source to maintain the image sensor at a suitably-low temperature. For instance, the compressor or cryogenic cooler system 206 may be employed to force air through the imaging system 200, or the compressor or cryogenic cooler system 206 may employ a cryocooler to cool the imaging system 200. However, operation of the compressor or cryogenic cooler system 206 and the imaging system 200 can generate heat in the endcap of the Dewar 204.

Dewar endcaps are a common thermal driver within an optical system and can have low thermal limits with a relatively high heat flux region. Additionally, structurally constraining the Dewar endcap can lead to significant optical jitter issues. Previous Dewar cooling approaches often have had bulky form factors, were too heavy to be utilized in certain applications, or lacked the thermal and jitter performance needed in certain applications. Various embodiments of the present disclosure address both thermal and jitter issues and allow for a design of a self-contained, forced-air cooled DAS or other system.

The imaging system 200 described in this disclosure may find use in a large number of applications. For example, optical systems may be used in consumer or commercial electronic devices, biomedical devices, or advanced computing devices. The imaging system 200 may be used in airplanes, drones, satellites, autonomous vehicles, rockets, missiles, firearms, or other commercial or defense-related systems. The imaging system 200 may be used in non-communication-related optical applications, such as laser detection and ranging (LADAR) applications. In general, this disclosure is not limited to any particular application of the imaging systems.

Although FIG. 2 illustrates one example of an imaging system 200 including a Dewar, various changes may be made to FIG. 2. For example, the optic system 202 can represent any suitable optical-based system. Also, the lens stack may include any suitable number of optical lenses. In addition, the imaging system 200 is shown in simplified form here and may include any number of additional components in any suitable configuration as needed or desired.

FIGS. 3A through 3K illustrate an example Dewar assembly 300 according to this disclosure. For ease of explanation, the Dewar assembly 300 may be described as representing or being used as part of the Dewar system 100 of FIG. 1. However, the Dewar assembly 300 may be used as, in, or with any other suitable device or system.

Figure 3A:
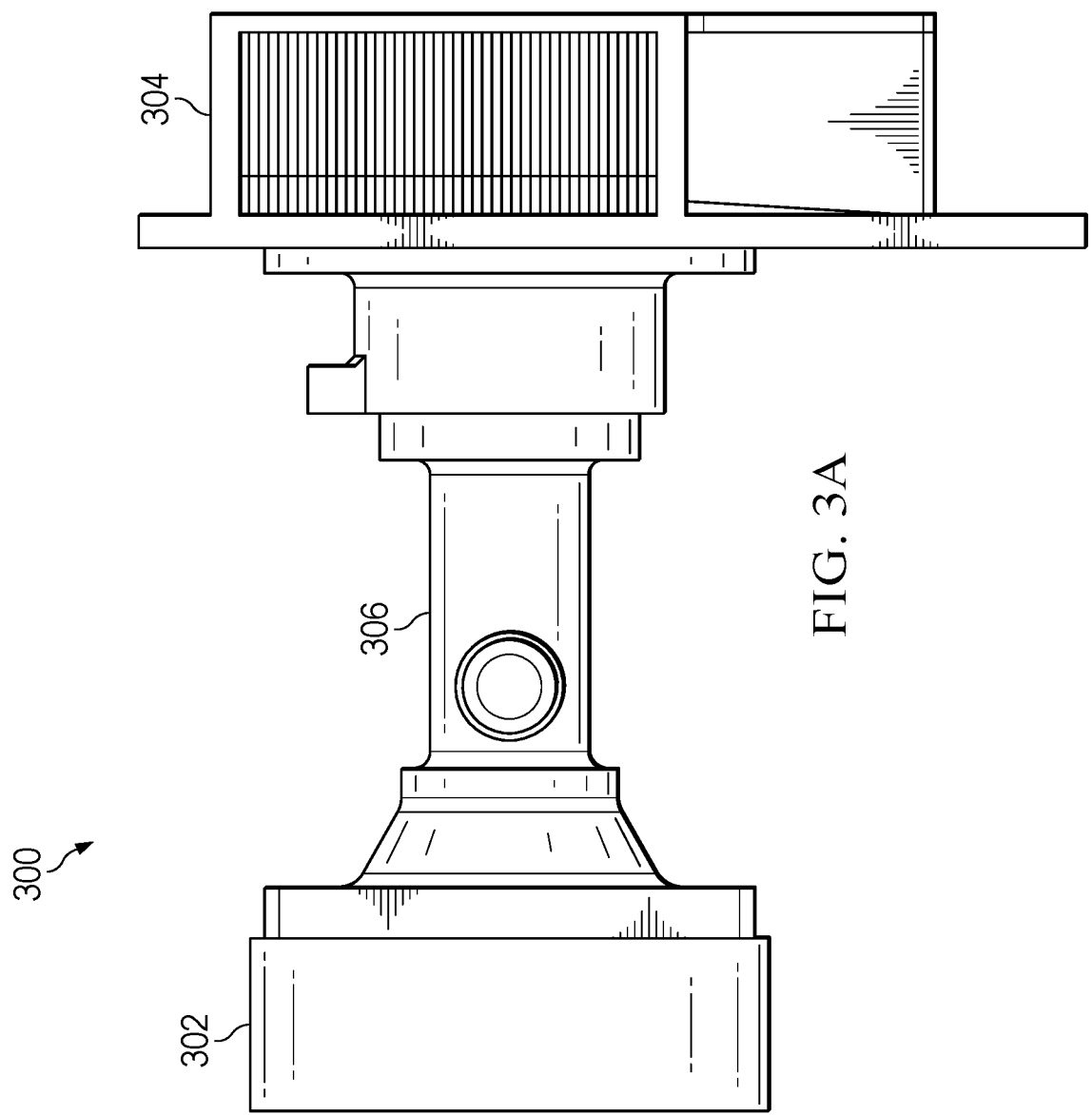
FIGS. 3A through 3K illustrate an example integrated Dewar assembly according to this disclosure.

As shown in FIG. 3A, the Dewar assembly 300 is coupled at a first end to an optic device 302 and coupled at a second end to a heat sink 304. In the example shown in FIG. 3A, the heat sink 304 is disposed at a location in-line with the Dewar assembly 300 and optic device 302 of the imaging device. The Dewar assembly 300 includes a housing 306. The housing 306 may be formed from any suitable material(s), such as one or more metals, and in any suitable manner. The housing 306 may also have any suitable size, shape, and dimensions.

Figure 3B:
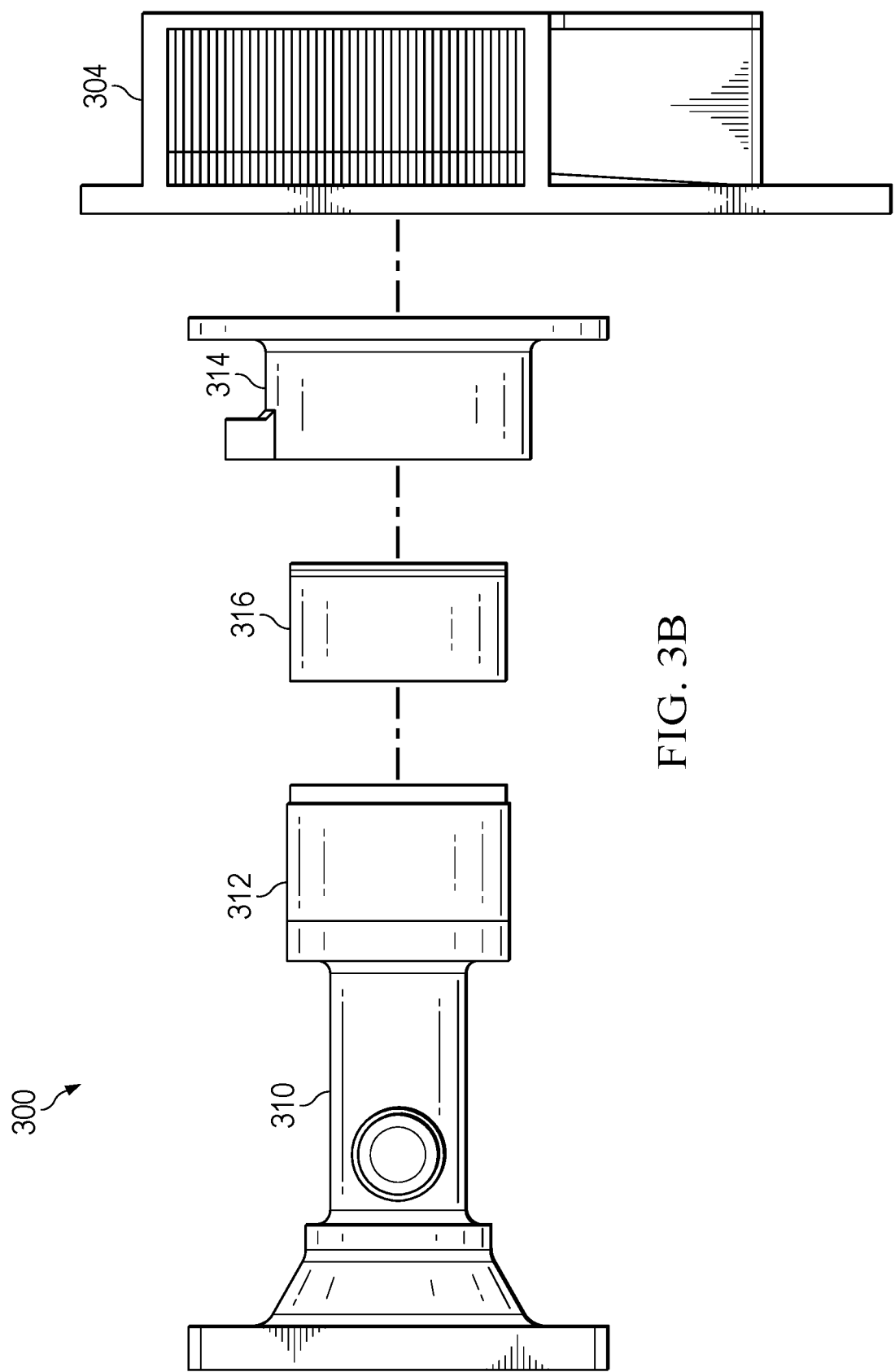

As shown in FIG. 3B, the Dewar assembly 300 includes a Dewar 310, an endcap 312, a thermal shoe 314, and a thermal interface material 316. The thermal interface material 316 is configured to surround the endcap 312. The thermal interface material 316 enables the transfer of thermal energy while restricting the transfer of mechanical energy between the heat sink 304 and the Dewar 310. That is, the thermal interface material 316 is configured to facilitate a cooling of the endcap 312 while allowing for structural compliance. The heat sink 304 can include at least one coldwall, coldplate, or other cooling structure. As shown in this particular example, the heat sink 304 can include a coldwall with a plurality of fins.

The thermal shoe 314 is configured to receive the endcap 312 and the thermal interface material 316. For example, the endcap 312 may be inserted into the thermal shoe 314 with the thermal interface material 316 disposed between an outer surface of the endcap 312 and an inner surface of the thermal shoe 314. The thermal shoe 314 is also configured to hold the thermal interface material 316 against the endcap 312. The thermal shoe 314 is further coupled to the heat sink 304. The thermal interface material 316 and the thermal shoe 314 thereby form a thermal path between the endcap 312 and the heat sink 304. In some embodiments, the thermal path is formed by the thermal shoe 314 distributing thermal energy from the endcap 312 over a larger area of the heat sink 304, thereby providing a larger "footprint" on the heat sink 304. This can be accomplished since the thermal shoe 314 can have (i) a portion associated with the thermal interface material and having a smaller cross-sectional area and (ii) a portion associated with the heat sink and having a larger cross-sectional area.

Figure 3C:
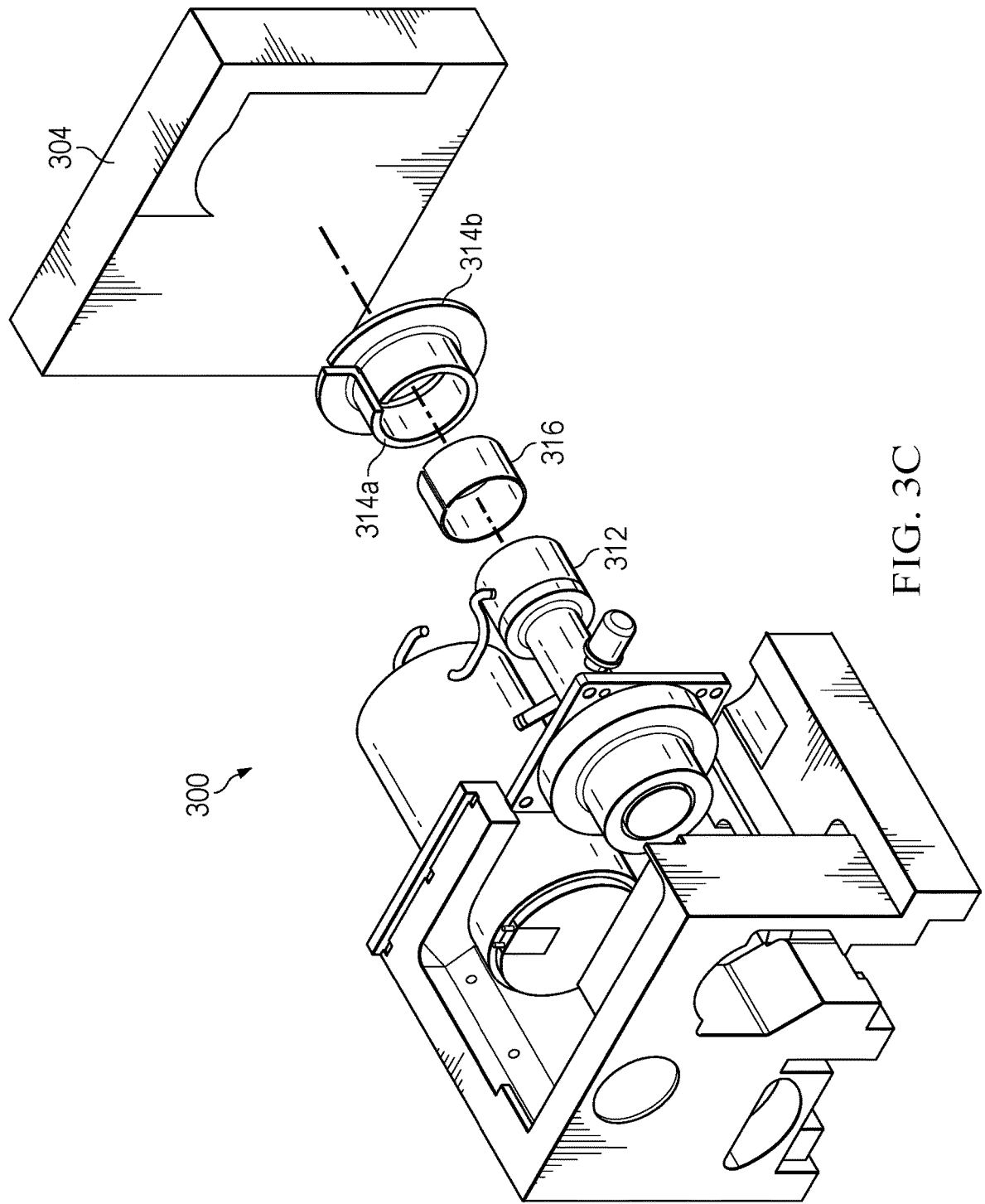
Figure 3D:
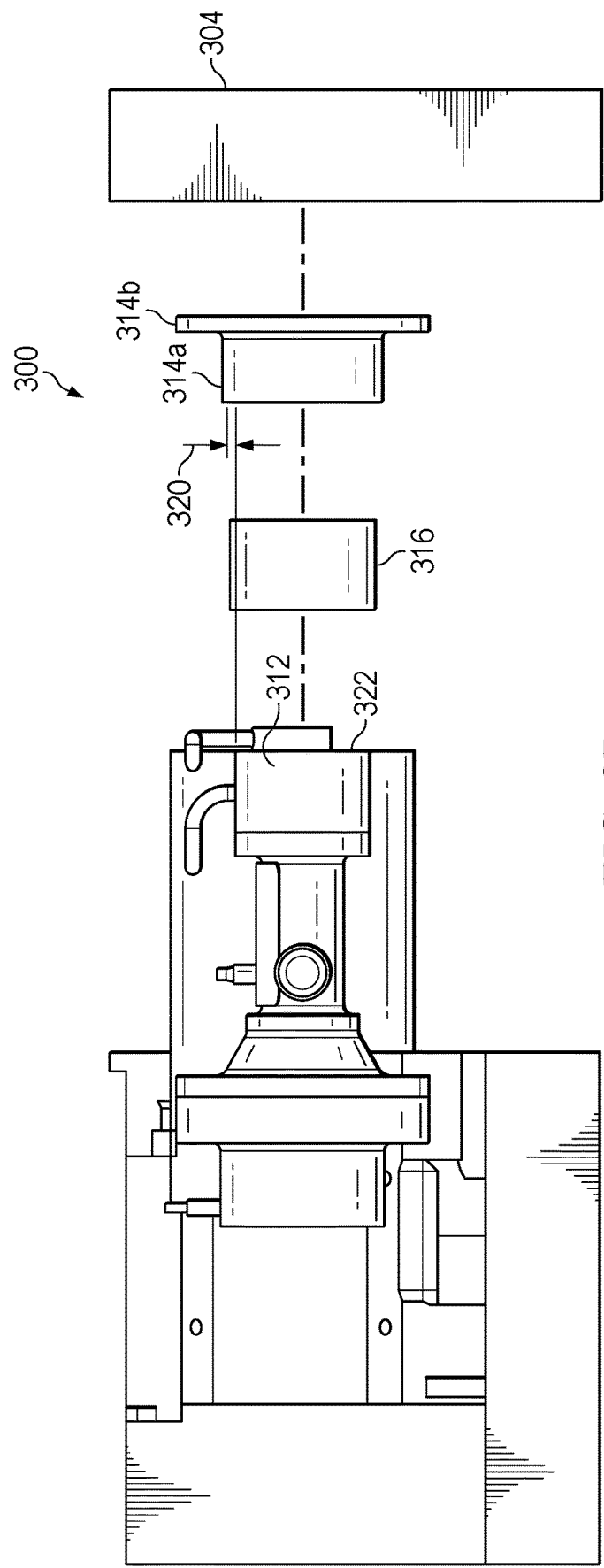

As shown in FIGS. 3C and 3D, the thermal shoe 314 includes a first portion 314a that is dimensioned to provide a gap 320 between an outer surface of the endcap 312 and an inner surface of the thermal shoe 314. Accordingly, a portion or all of the endcap 312 can be inserted into the first portion 314a of the thermal shoe 314. The thermal interface material 316 is disposed in the gap 320 and is configured to facilitate a thermal transfer between the endcap 312 and the thermal shoe 314. For example, the thermal interface material 316 can be injected, pressed, or otherwise placed into the thermal shoe 314. As the endcap 312 is inserted into the thermal shoe 314, the thermal interface material 316 (being malleable or compliant) moves around the endcap 312 into the gap 320 between the outer surface of the endcap 312 and the inner surface of the thermal shoe 314. The thermal interface material 316 can fill a portion, a substantial portion (such as more than 50%), or all of the gap 320 between the endcap 312 and the thermal shoe 314 when the endcap 312 is inserted into the thermal shoe 314. The interface between the endcap 312 and thermal shoe 314, with the thermal interface material 316 therebetween, includes a large surface area. In some embodiments, the surface area of the interface between the endcap 312 and the thermal shoe 314 is larger than a surface area of an end 322 of the endcap 312.

The thermal shoe 314 also includes a second portion 314b that has a larger cross-sectional area than the first portion 314a. That is, the thermal shoe 314 has (i) a smaller cross-sectional size in the first portion 314a of the thermal shoe 314 contacting the thermal interface material 316 and (ii) a larger cross-sectional size in the second portion 314b of the thermal shoe 314 contacting the heat sink 304. The second portion 314b is configured to couple to the heat sink 304. The second portion 314b includes a large surface area, which helps to facilitate thermal transfer to the heat sink 304.

The thermal shoe 314 is further configured to secure the endcap 312 of the Dewar assembly 300 without introducing jitter. For example, the pliability of the thermal interface material 316 disposed between the endcap 312 and the thermal shoe 314 enables the thermal interface material 316 to absorb mechanical energy. As a result, the interface of the endcap 312, the thermal interface material 316, and the thermal shoe 314 is configured to restrict a transfer of mechanical energy from the thermal shoe 314 or the heat sink 304 into the Dewar assembly 300.

Figure 3E:
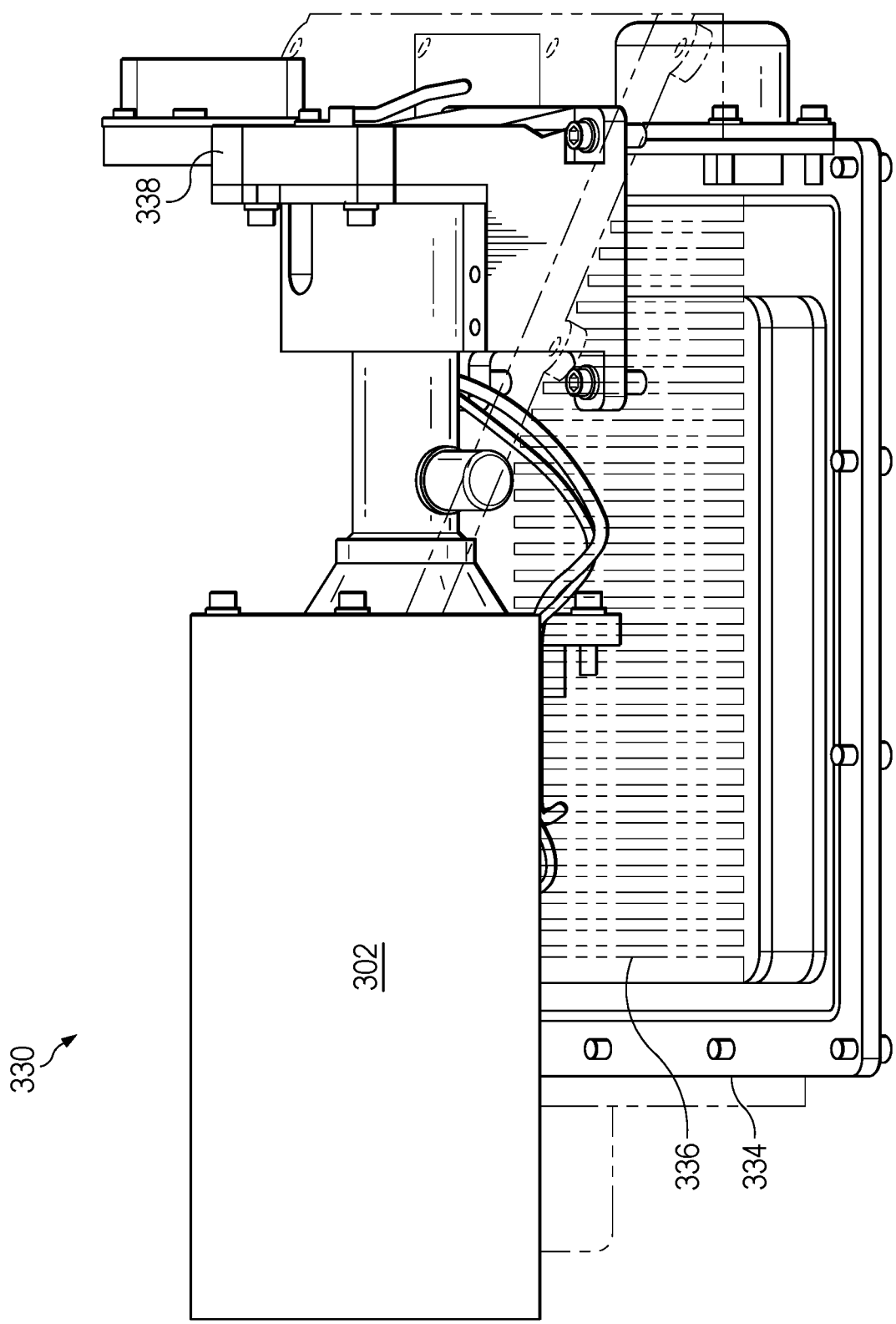
Figure 3F:
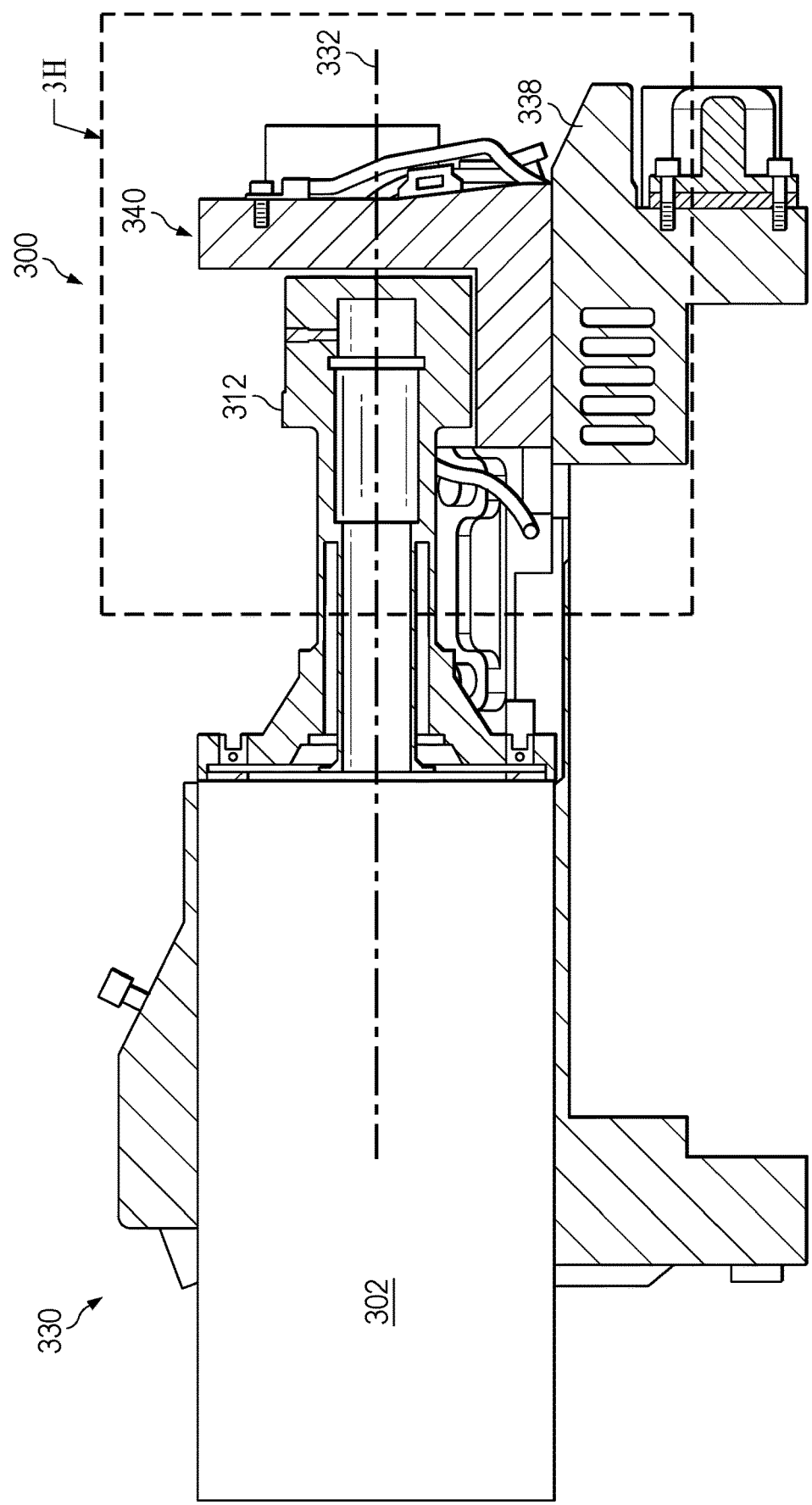

As shown in FIGS. 3E and 3F, an imaging system 330 includes a cooling surface, such as a heat sink, disposed at a location that is not in-line with the optic device 302 (meaning not along an optical centerline 332 of the optic device 302). For example, the imaging system 330 can include a bottom chassis 334 that includes a lower heat sink 338 having a cooling channel and fins 336. The Dewar assembly 300 is coupled at a first end to the optic device 302 and coupled on a bottom surface, which is crosswise to the first end, to the lower heat sink 338. As shown in this particular example, the Dewar assembly 300 includes a thermal shoe 340 that is configured to couple the Dewar assembly 300 to the lower heat sink 338 via one of at least two axial surfaces. That is, the thermal shoe 340 is multi-axial and includes a first mounting surface along a first axis and a second mounting surface along a second axis. The thermal shoe 340 can be similar in material and function to the thermal shoe 314. For instance, the thermal interface material 316 and the thermal shoe 340 form a thermal path between the endcap 312 and the lower heat sink 338. In the example shown, the lower heat sink 338 is included in the bottom chassis 334 and can include at least one of a cooling channel, a cooling surface, a coldwall, a coldplate, or other cooling structure. As shown in this particular example, the lower heat sink 338 includes a cooling surface with a plurality of fins.

The thermal shoe 340 is multiaxial and includes a first surface corresponding to the endcap 312, a second surface opposite the first surface, and a bottom surface crosswise to the first surface and second surface. The first and second surfaces are disposed along a first axis, while the bottom surface is disposed along a second axis. The thermal shoe 340 is configured to receive the endcap 312 and the thermal interface material 316. For example, the endcap 312 may be inserted into the thermal shoe 340 with the thermal interface material 316 disposed between an outer surface of the endcap 312 and an inner surface of the thermal shoe 340. The thermal shoe 340 is also configured to hold the thermal interface material 316 against the endcap 312. The thermal shoe 340 is further coupled to the lower heat sink 338 via one of the second surface and the bottom surface. The thermal interface material 316 and the thermal shoe 340 thereby form a thermal path between the endcap 312 and the lower heat sink 338. In some embodiments, the thermal path is formed by the thermal shoe 340 distributing thermal energy from the endcap 312 over a larger area of the lower heat sink 338, thereby providing a larger "footprint" on the lower heat sink 338. This can be accomplished since the thermal shoe 340 can have (i) a portion associated with the thermal interface material and having a smaller cross-sectional area and (ii) a portion associated with the lower heat sink 338 and having a larger cross-sectional area. In some embodiments, the thermal shoe 340 includes mass, volume, and cooling surface contact area that are suitable for the specific application.

Figure 3G:
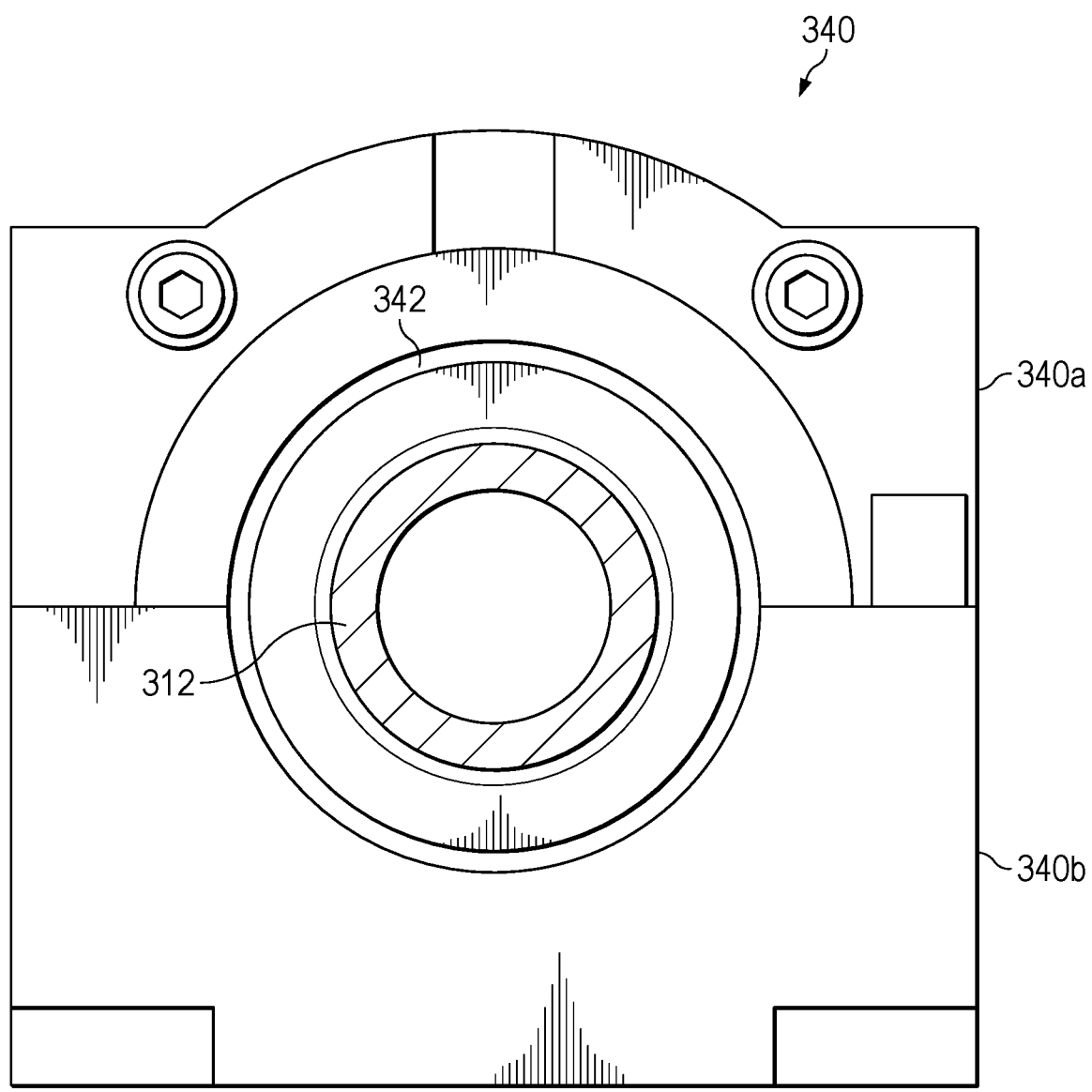
Figure 3H:
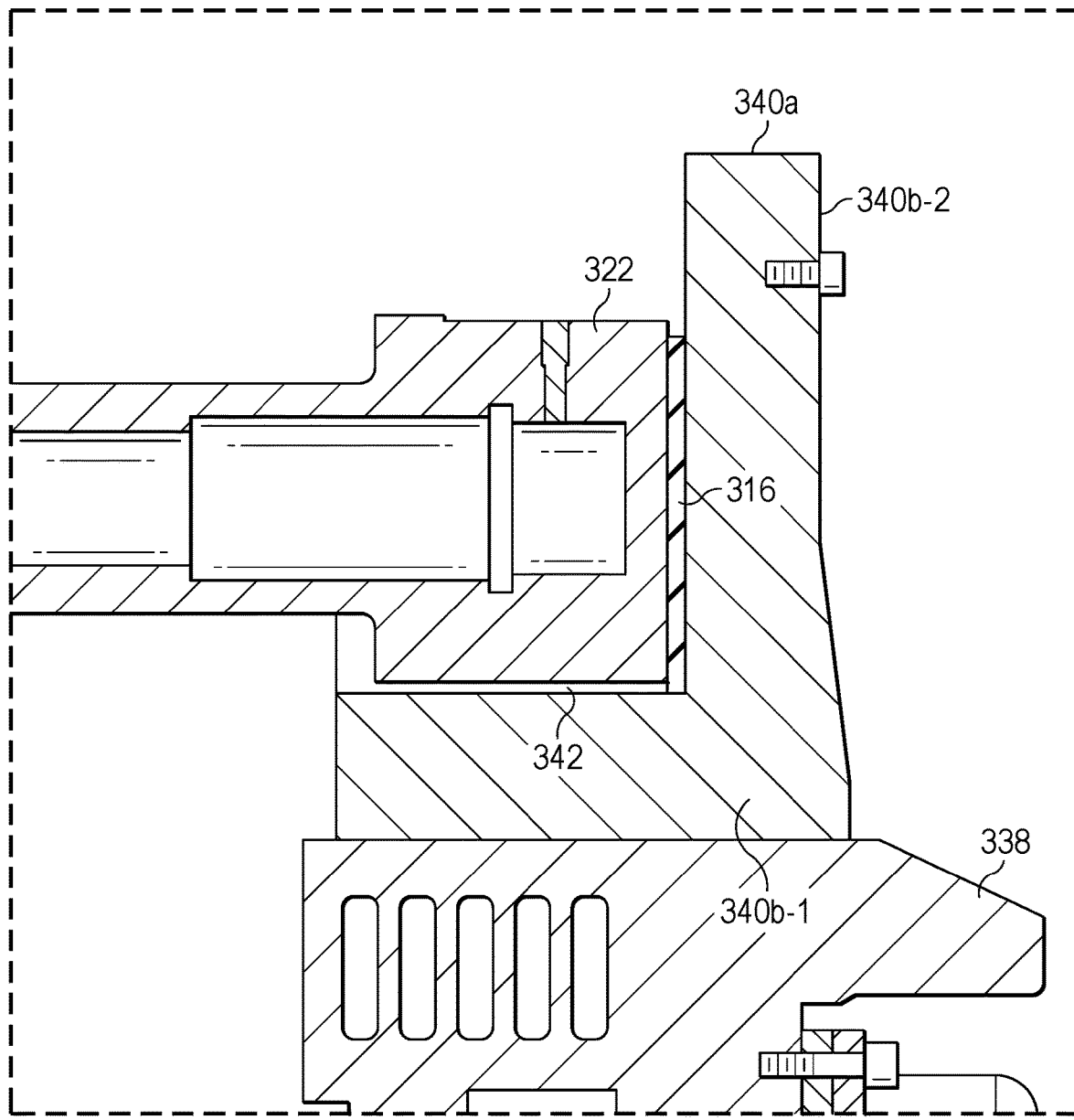

As shown in FIGS. 3G and 3H, in some embodiments, the thermal shoe 340 can be a two-piece clamp shell including a first portion 340a and a second portion 340b that are dimensioned (when coupled together) to provide a gap 342 between an outer surface of the endcap 312 and an inner surface of the thermal shoe 340. Accordingly, a portion or all of the endcap 312 can be inserted into the thermal shoe 340. The thermal interface material 316 is disposed in the gap 342 and is configured to facilitate a thermal transfer between the endcap 312 and the thermal shoe 340. The thermal interface material 316 can be injected, pressed, or otherwise placed into the thermal shoe 340. As the endcap 312 is inserted into the thermal shoe 340, the thermal interface material 316 (being malleable or compliant) moves around the endcap 312 into the gap 342 between the outer surface of the endcap 312 and the inner surface of the thermal shoe 340. The thermal interface material 316 can fill a portion, a substantial portion (such as more than 50%), or all of the gap 342 between the endcap 312 and the thermal shoe 340 when the endcap 312 is inserted into the thermal shoe 340. The interface between the endcap 312 and thermal shoe 340, with the thermal interface material 316 therebetween, includes a large surface area. In some embodiments, the surface area of the interface between the endcap 312 and the thermal shoe 340 is larger than a surface area of an end 322 of the endcap 312. The thermal shoe 340, including the thermal interface material 316, thereby forms a thermal path between the endcap 312 and the lower heat sink 338.

The second portion 340b includes a base portion 340b-1 and a vertical portion 340b-2 extending from the base portion 340b-1, and the second portion 340b has a larger cross-sectional area than the endcap 312. That is, the thermal shoe 340 has (i) a first cross-sectional size where the thermal shoe 340 contacts the thermal interface material 316 and (ii) a larger cross-sectional size where the thermal shoe 340 contacts the lower heat sink 338. The base portion 340b-1 extends along a first axis, and the vertical portion 340b-2 extends along a second axis. Each of the base portion 340b-1 and the vertical portion 340b-2 is configured to couple to a heat sink. For example, the base portion 340b-1 is configured to couple to the lower heat sink 338. The base portion 340b-1 includes a large surface area, which helps to facilitate thermal transfer to the lower heat sink 338.

The thermal shoe 340 is further configured to couple to the endcap 312 of the Dewar assembly 300 without introducing jitter. The pliability of the thermal interface material 316 disposed between the endcap 312 and the thermal shoe 340 enables the thermal interface material 316 to absorb mechanical energy. As a result, the interface of the endcap 312, the thermal interface material 316, and the thermal shoe 314 can be configured to restrict a transfer of mechanical energy from the thermal shoe 314 or the lower heat sink 338 into the Dewar assembly 300.

Figure 3I:
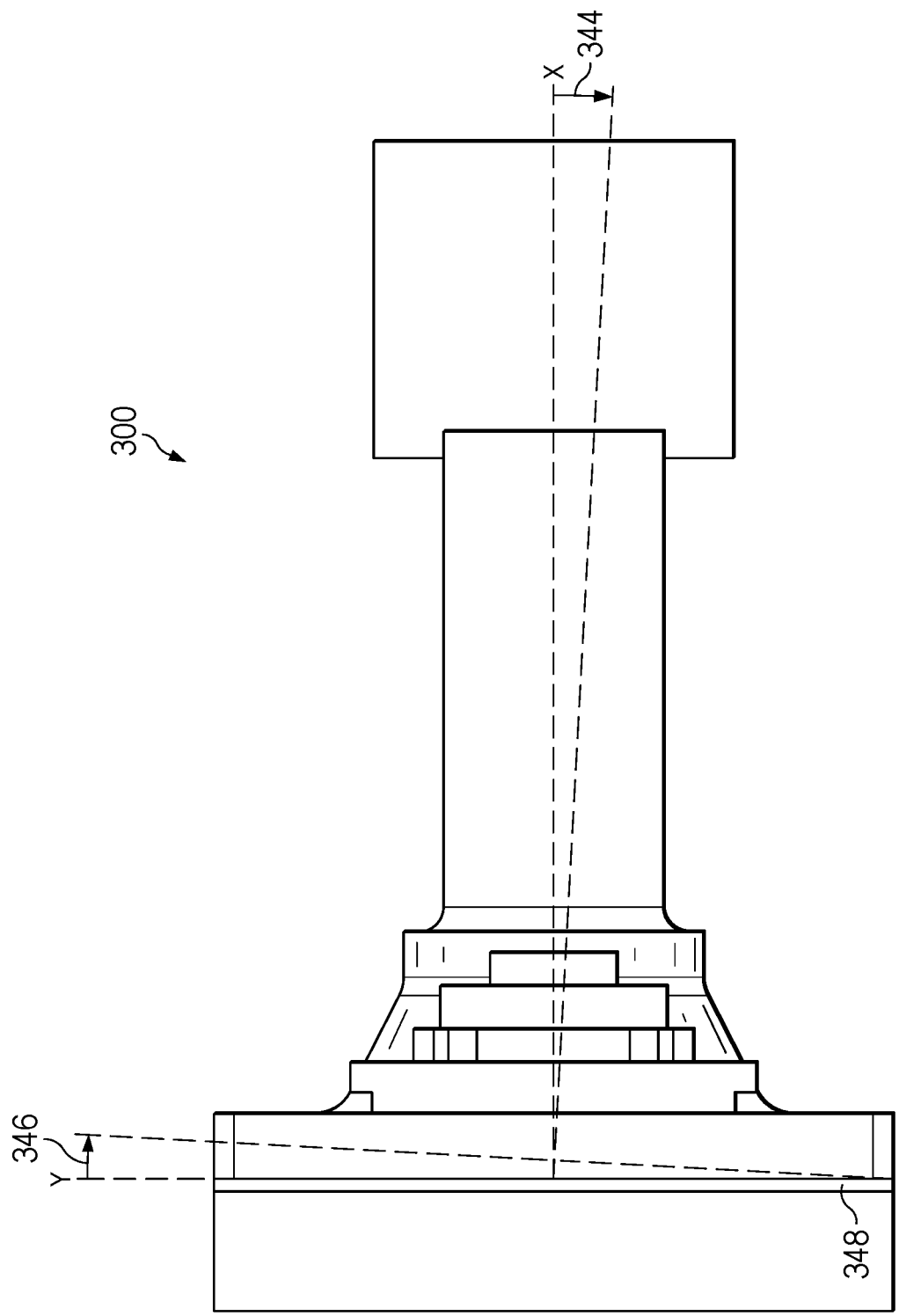
Figure 3J:
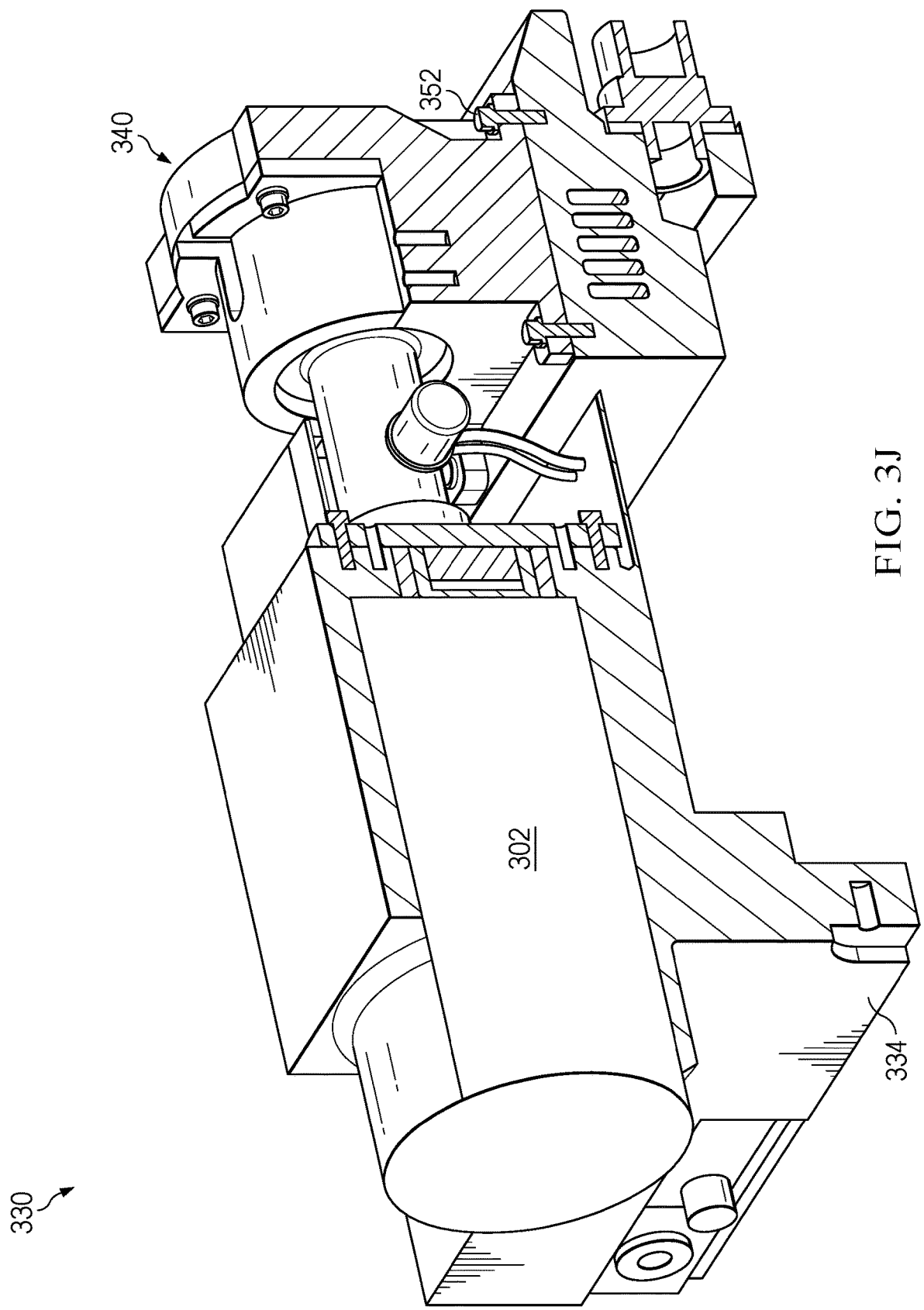
Figure 3K:
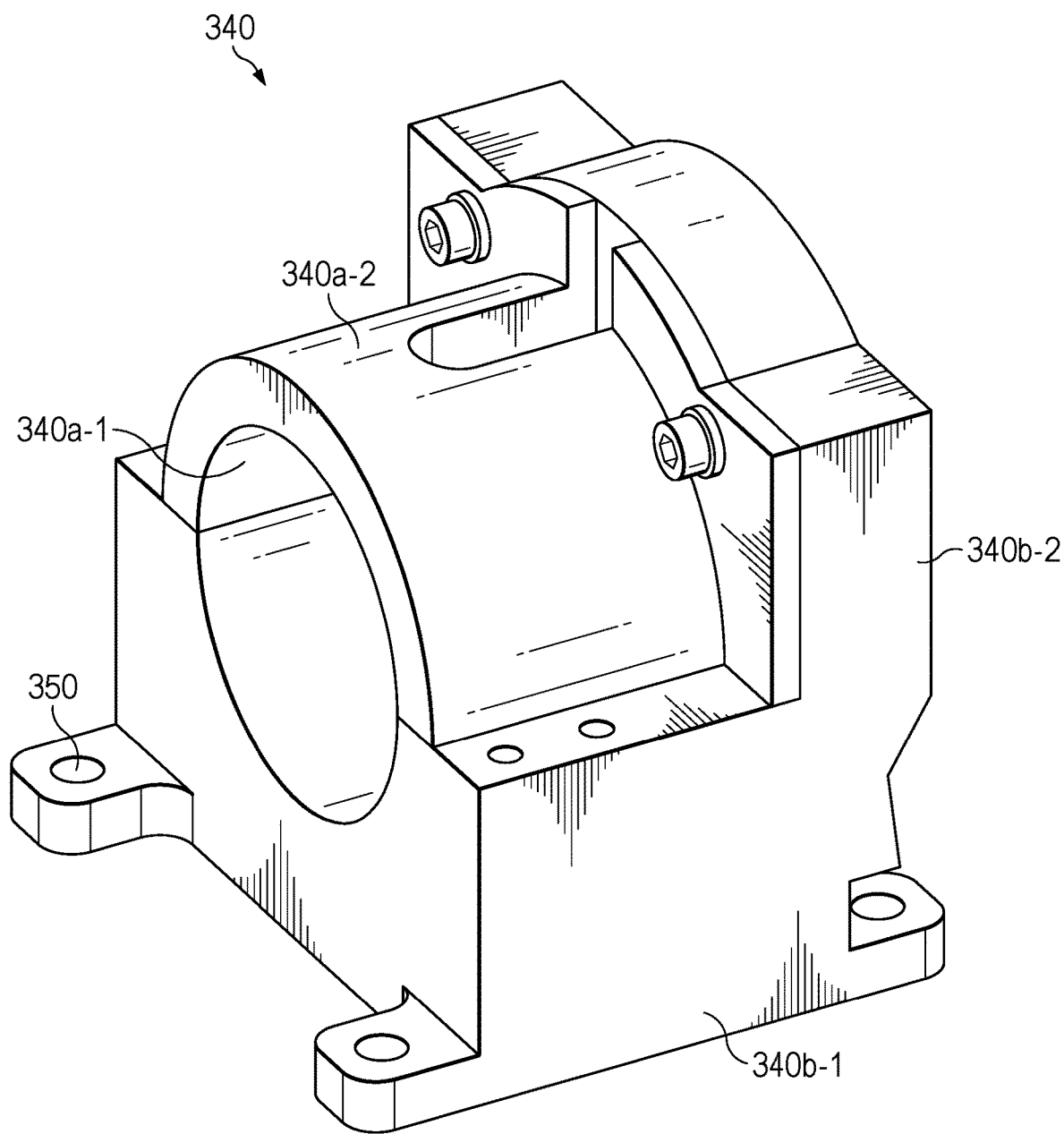

As shown in FIGS. 3I through 3K, the thermal shoe 340 may also be configured to compensate for optical displacement in the imaging device 330. For example, certain optic lenses may require precision and complex alignment (such as tip and tilt) in three-dimensional (3D) degree of freedom while maintaining fixed surface contact and alignment to effectively transfer heat generated from the endcap 312 of the expander. In this example, the thermal shoe 340 includes multidirectional alignment features. For instance, the thermal shoe 340 can compensate for displacement tip/tilt 344 from the optical centerline 332 or a cantilever shimming 346 from a surface 348 of the optic device 302. In some embodiments, the thermal shoe 340 includes a thermal potting, such as the thermal interface material 316, that allows tip and tilt while providing thermal coefficient of expansion compensation.

In some embodiments, the thermal shoe 340 includes oversized mounting holes 350 that can receive semi-rigid shoulder bolts 352 (optionally with wave washers) and that allow axial movement to compensate for a rate difference when the optic device 302 is operating at elevated temperatures while maintaining surface contact with the lower heat sink 338 to dissipate heat. As shown in the example of FIG. 3K, the first portion 340a is a curved structure having an inner surface 340a-1 and an exterior surface 340a-2. The base portion 340b-1 includes a mounting surface having the oversized mounting holes 350 that allow for at least one plane self-alignment with the expander. The shoulder bolts 352 fasten the Dewar assembly 300 to the lower heat sink 338. The shoulder bolts 352 facilitate a sliding motion to compensate for thermal expansion from different materials used in different structures.

The thermal shoe 340 is configured to allow self-alignment with line-of-sight in at least one direction. The thermal shoe 340 further allows 3D degree of freedom movements via tip and tilt compensation by thermal potting in the radial and axial directions. The thermal shoe 340 is configured to allow axial movement to compensate for a rate difference when the imaging system 330 operates at elevated temperatures while maintaining surface contact to dissipate heat to the cooling surface.

A thermal shoe, whether configured as the thermal shoe 314 or the thermal shoe 340, can dissipate heat through conduction and convection via at least one cooling surface. The thermal shoe can be configured to semi-rigidly connect the Dewar assembly 300 to an air or fluid cooling stream on at least one cooling surface. The thermal shoe can also be configured to couple to a heat sink along a first axis that is in-line with the optical centerline or to couple to the heat sink via a second axis that is crosswise (such as perpendicular) to the optical centerline and above or below the optical centerline.

Although FIGS. 3A through 3K illustrate examples of a Dewar assembly 300, various changes may be made to FIGS. 3A through 3K. For example, the Dewar assembly 300 may include any suitable number of optical devices or different types of heat sinks. Moreover, any other suitable components may be used with the Dewar assembly 300 to support any other desired functions of the Dewar assembly 300. In addition, the components and other details shown in FIG. 3A through 3K are for illustration only.

Figure 4:
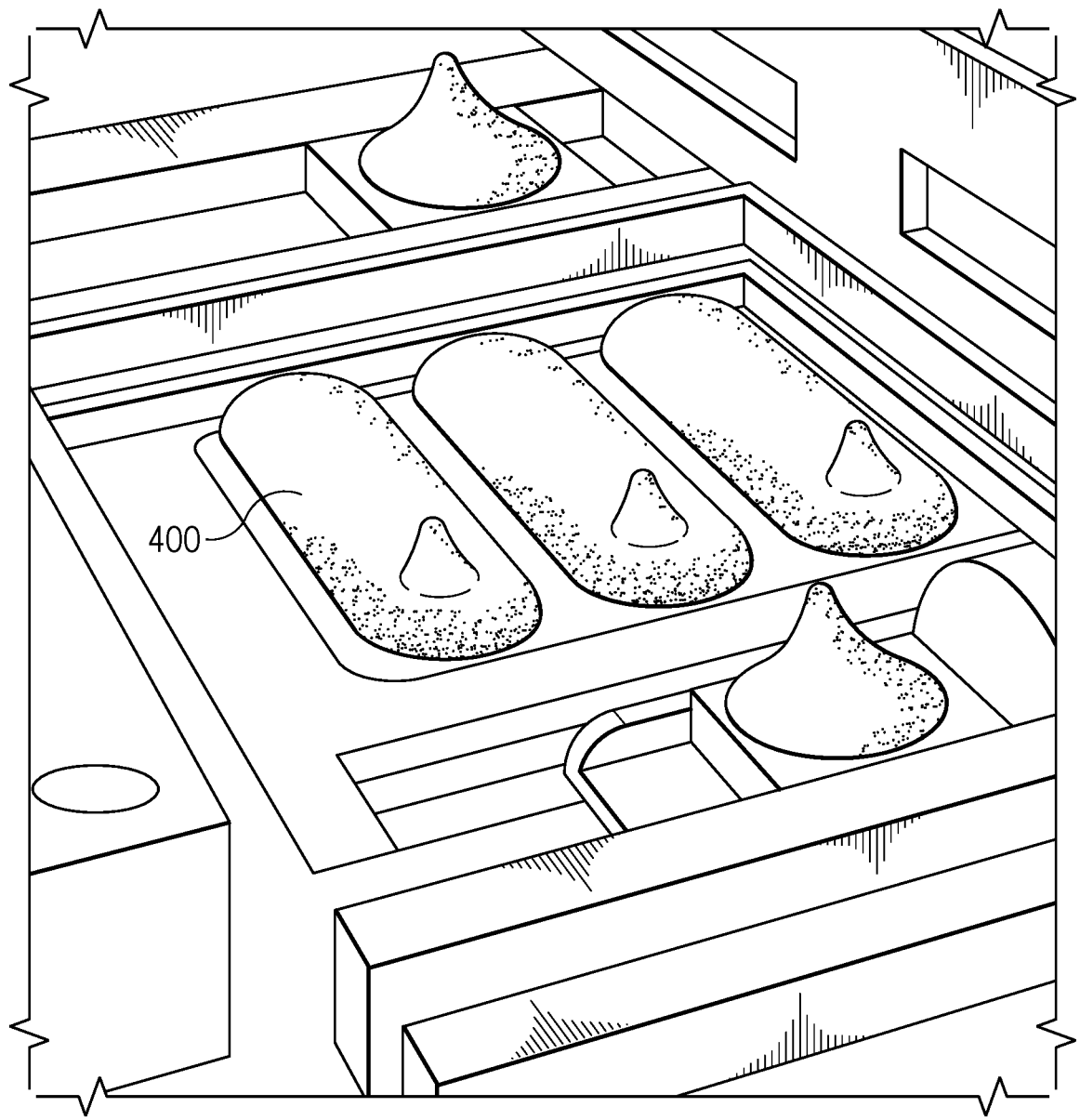
FIG. 4 illustrates an example thermal interface material according to this disclosure.

FIG. 4 illustrates an example thermal interface material 400 according to this disclosure. For ease of explanation, the thermal interface material 400 may be described as representing the thermal interface material 316 of FIGS. 3A through 3D. However, the thermal interface material 400 may be used with any other suitable device or system.

The thermal interface material 400 is a highly-thermally conductive filler, such as a high thermal conductivity liquid gap material. As a specific example, the thermal interface material 400 may represent a ceramic-filled single-part silicone dispensable material. The thermal interface material 400 can be a no-set, no-cure, or malleable material that remains amorphous and pliable at a range of temperatures, such as about 77 Kelvin to about 120 Kelvin. In some embodiments, the thermal interface material 400 has a thermal conductivity of at least about 6.4 Watts per meter Kelvin (W/mK). The thermal interface material 400 is adaptable to be pressed into the thermal shoe 314 and transition around the endcap 312 as the endcap 312 is inserted into the thermal shoe 314. In some embodiments, the thermal interface material 400 is formed using LAIRD TPUTTY 607, LAIRD TFLEX SF20, or TIM_PUTTY 6W.

Although FIG. 4 illustrates one example of a thermal interface material 400, various changes may be made to FIG. 4. For example, the thermal interface material 400 may be deposited in any suitable form and is not limited to the specific arrangement shown in FIG. 4.

Figure 5:
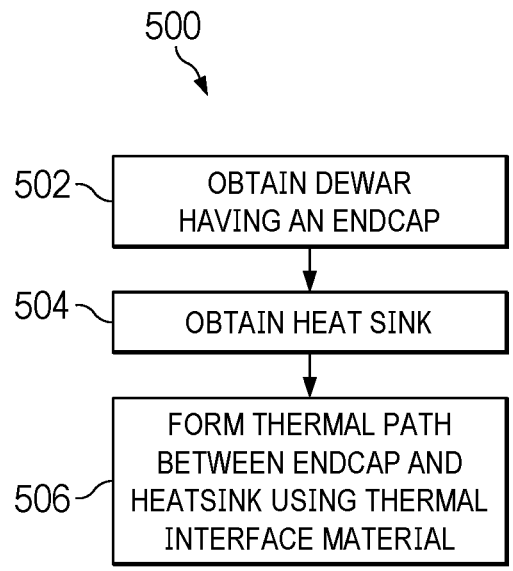
FIG. 5 illustrates an example method for producing a Dewar assembly having a compliant endcap and thermal interface according to this disclosure.

FIG. 5 illustrates an example method 500 for producing a Dewar assembly having a compliant endcap and thermal interface according to this disclosure. For ease of explanation, the method 500 is described with respect to the Dewar assembly 300 of FIGS. 3A through 3D. However, the method 500 could be used with any other suitable Dewar assembly and any other suitable system.

In step 502, a Dewar 310 is obtained or formed. The Dewar 310 includes an endcap 312. The Dewar 310 can be formed from any suitable material(s), and the endcap 312 can have any suitable form factor. For example, the endcap 312 can be dimensioned to have a cylindrical form factor with a circular end surface in some embodiments. In step 504, a heat sink 304 is obtained. The heat sink 304 can represent any suitable device configured to draw thermal energy away from a coupled system or device. In some embodiments, the heat sink 304 is a coldwall or a coldplate. For example, the heat sink 304 can be a coldwall with a plurality of fins.

In step 506, a thermal path is formed between the endcap 312 and the heat sink 304 using a thermal interface material. For example, a thermal shoe 314 may be obtained or formed to accommodate the form factor of the endcap 312. The thermal shoe 314 may also be coupled to the heat sink 304. The thermal shoe 314 may include a cross-sectional opening larger than the end surface of the endcap 312 such that the endcap 312 is insertable into an opening at a receiving end of the thermal shoe 314. When the endcap 312 is inserted into the thermal shoe 314, a gap 320 can be formed between an outer surface of the endcap 312 and an inner surface of the thermal shoe 314. A thermal interface material 316 can be pressed, placed, injected, or otherwise positioned in the gap 320 between the endcap 312 and the thermal shoe 314. In some embodiments, the thermal interface material 316 is placed in the opening of the thermal shoe 314 prior to the endcap 312 being inserted into the thermal shoe 314. In other embodiments, the thermal interface material 316 is placed in the gap 320 between the thermal shoe 314 and the endcap 312 after the endcap 312 is inserted into the thermal shoe 314. A combination of these approaches may also be used. The thermal interface, including the thermal interface material 316 and the thermal shoe 314, can be configured to form a thermal path between the endcap 312 and thermal shoe 314. The thermal interface may position the endcap 312 near the heat sink 304, such as a vertical thermal coldwall, and utilize a thermal interface material 316 to bridge the gap 320. The thermal interface ensures a low temperature rise and allows the endcap 312 to be structurally decoupled from the surrounding structure. The thermal interface also can be used with the thermal shoe 314 to (i) increase an amount of thermal interface material 316; (ii) increase a surface area between the endcap 312 and thermal shoe 314; and (iii) provide a larger footprint, namely larger surface area, on the coldwall.

In some implementations, the thermal interface provides a higher thermal transfer efficiency and jitter response than heat straps, heat pipes, or bolt-on fins. For example, one example driver on an electro-optic (EO) distributed aperture design is a trade-off between thermal efficiency and structural rigidity on the Dewar endcap. As the mass of an endcap thermal strap is increased for better thermal conductance, the rigidity of the strap increases, causing increased jitter. For example, in an example Dewar-cooled system with a compliant heat strap, the delta between the endcap 312 and the coldwall may be about 16° C. Conversely, in a Dewar-cooled system with a compliant endcap having the thermal interface material 316 and thermal shoe 314, the delta between the endcap 312 and the coldwall may be about 2° C. Thus, the Dewar-cooled system with a compliant endcap can provide improved jitter performance.

Although FIG. 5 illustrates one example of a method 500 for producing a Dewar assembly having a compliant endcap and thermal interface, various changes may be made to FIG. 5. For example, while shown as a series of steps, various steps in FIG. 5 could overlap, occur in parallel, occur in a different order, or occur multiple times.

Figure 6:
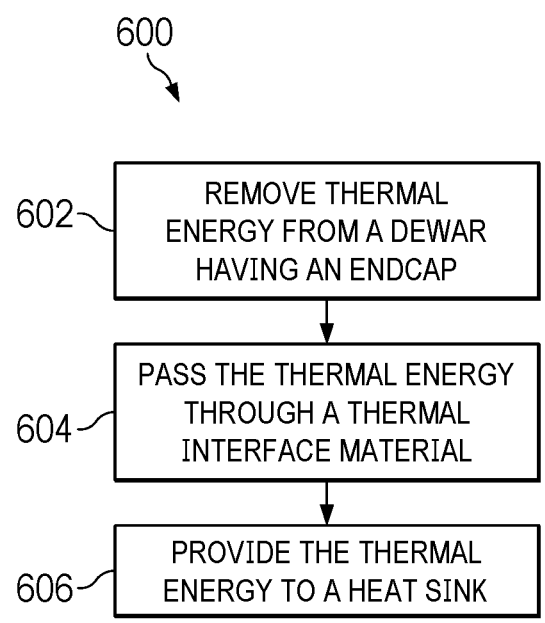
FIG. 6 illustrates an example method for removing thermal energy from a Dewar assembly having a compliant endcap according to this disclosure.

FIG. 6 illustrates an example method 600 for removing thermal energy from a Dewar assembly having a compliant endcap according to this disclosure. For ease of explanation, the method 600 is described with respect to the Dewar assembly 300 of FIGS. 3A through 3D. However, the method 600 could be used with any other suitable Dewar assembly and any other suitable system.

In step 602, thermal energy is removed from a Dewar assembly having an endcap. In some cases, the endcap 312 includes a first cross-sectional area at an end 322 of the endcap 312, which can be positioned near a heat sink 304 like a coldwall. The endcap 312 of the Dewar 310 is physically separated from the heat sink 304 by a gap 320. The gap 320 can be at least partially filled using a thermal interface material 316, and the thermal interface material 316 thermally couples the endcap 312 of the Dewar assembly 300 to the heat sink 304. The thermal interface material 316 also restricts a mechanical energy transfer between the heat sink 304 and the Dewar assembly 300. That is, the thermal interface material 316 does not structurally couple the Dewar assembly 300 to the heat sink 304.

In step 604, the thermal energy is passed through the thermal interface material 316. The thermal interface material 316 can represent a low-stress compliant material that effectively transfers thermal energy from the Dewar 310 to the heat sink 304 without structurally coupling the Dewar 310 to the heat sink 304. The low-stress compliant material can be material configured to comply with the thermal transfer and rigidity requirements for a Dewar-cooled optic system. For example, the thermal interface material 400 may be a highly thermally conductive liquid gap filler, such as a high thermally conductive (ceramic-filled) single part dispensable material. The thermal interface material 316 is configured to pass the thermal energy from the endcap 312 to another coupled device, such as the thermal shoe 314 or heat sink 304, without structurally coupling the endcap 312 to the other coupled device.

In step 606, the thermal interface material 316 passes the thermal energy to the heat sink 304. In some embodiments, the thermal interface material 316 passes the thermal energy to the heat sink 304 through the thermal shoe 314, which is coupled to the heat sink 304. The thermal shoe 314 provides a larger footprint, namely larger surface area, on the heat sink 304. The heat sink 304 can represent any suitable device configured to draw thermal energy away from a coupled system or device. In some embodiments, the heat sink includes one or more coldwalls or coldplates, such as a coldwall with a plurality of fins.

Although FIG. 6 illustrates one example of a method 600 for removing thermal energy from a Dewar assembly having a compliant endcap, various changes may be made to FIG. 6. For example, while shown as a series of steps, various steps in FIG. 6 could overlap, occur in parallel, occur in a different order, or occur multiple times.

It may be advantageous to set forth definitions of certain words and phrases used throughout this patent document. The terms "include" and "comprise," as well as derivatives thereof, mean inclusion without limitation. The term "or" is inclusive, meaning and/or. The phrase "associated with," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, have a relationship to or with, or the like. The phrase "at least one of," when used with a list of items, means that different combinations of one or more of the listed items may be used, and only one item in the list may be needed. For example, "at least one of: A, B, and C" includes any of the following combinations: A, B, C, A and B, A and C, B and C, and A and B and C.

The description in the present disclosure should not be read as implying that any particular element, step, or function is an essential or critical element that must be included in the claim scope. The scope of patented subject matter is defined only by the allowed claims. Moreover, none of the claims invokes 35 U.S.C. § 112(f) with respect to any of the appended claims or claim elements unless the exact words "means for" or "step for" are explicitly used in the particular claim, followed by a participle phrase identifying a function. Use of terms such as (but not limited to) "mechanism," "module," "device," "unit," "component," "element," "member," "apparatus," "machine," "system," "processor," or "controller" within a claim is understood and intended to refer to structures known to those skilled in the relevant art, as further modified or enhanced by the features of the claims themselves, and is not intended to invoke 35 U.S.C. § 112(f).

While this disclosure has described certain embodiments and generally associated methods, alterations and permutations of these embodiments and methods will be apparent to those skilled in the art. Accordingly, the above description of example embodiments does not define or constrain this disclosure. Other changes, substitutions, and alterations are also possible without departing from the spirit and scope of this disclosure, as defined by the following claims.

What is claimed is:

1. An apparatus comprising:
a Dewar having an endcap;
a heat sink; and
a multiaxial thermal shoe comprising a thermal interface material and configured to thermally couple the endcap of the Dewar to the heat sink via one of at least two axial surfaces, the multiaxial thermal shoe configured to transfer thermal energy between the endcap of the Dewar and the heat sink without structurally coupling the Dewar to the heat sink.

2. The apparatus of claim 1, wherein the multiaxial thermal shoe couples to the heat sink via one of: a first axial surface in-line with an optical centerline or a second axial surface crosswise to the optical centerline.

3. The apparatus of claim 1, wherein the multiaxial thermal shoe has (i) a smaller cross-sectional size in a portion of the multiaxial thermal shoe contacting the thermal interface material and (ii) a larger cross-sectional size in a portion of the multiaxial thermal shoe contacting the heat sink.

4. The apparatus of claim 1, wherein the heat sink comprises a coldwall with fins.

5. The apparatus of claim 1, further comprising:
an imaging device positioned within the Dewar.

6. The apparatus of claim 1, wherein the multiaxial thermal shoe is configured to compensate for a tip/tilt or thermal expansion of one or more optics positioned proximate to the Dewar.

7. The apparatus of claim 1, wherein:
the thermal interface material comprises an amorphous pliable material; and
the multiaxial thermal shoe includes oversized mounting holes configured to couple the multiaxial thermal shoe to the heat sink and allow for at least one plane self-alignment.

8. A method comprising:
obtaining a Dewar having an endcap;
obtaining a multiaxial thermal shoe;
obtaining a heat sink;
coupling the heat sink to the multiaxial thermal shoe via one of at least two axial surfaces; and
placing a thermal interface material between the endcap and the multiaxial thermal shoe to thermally couple the endcap of the Dewar to the heat sink, the multiaxial thermal shoe configured to transfer thermal energy between the endcap of the Dewar and the heat sink without structurally coupling the Dewar to the heat sink.

9. The method of claim 8, wherein the multiaxial thermal shoe couples to the heat sink via one of: a first axial surface in-line with an optical centerline or a second axial surface crosswise to the optical centerline.

10. The method of claim 8, wherein the multiaxial thermal shoe has (i) a smaller cross-sectional size in a portion of the multiaxial thermal shoe contacting the thermal interface material and (ii) a larger cross-sectional size in a portion of the multiaxial thermal shoe contacting the heat sink.

11. The method of claim 8, wherein the heat sink comprises a coldwall with fins.

12. The method of claim 8, further comprising:
positioning an imaging device within the Dewar.

13. The method of claim 8, wherein the multiaxial thermal shoe is configured to compensate for a tip/tilt or thermal expansion of one or more optics positioned proximate to the Dewar.

14. The method of claim 8, wherein:
the thermal interface material comprises an amorphous pliable material; and
the multiaxial thermal shoe includes oversized mounting holes configured to couple the multiaxial thermal shoe to the heat sink and allow for at least one plane self-alignment.

15. A method comprising:
removing thermal energy from a Dewar having an endcap;
passing the thermal energy through a thermal interface material and a multiaxial thermal shoe; and
providing the thermal energy to a heat sink;
wherein the multiaxial thermal shoe thermally couples the endcap of the Dewar to the heat sink via one of at least two axial surfaces and transfers thermal energy between the endcap of the Dewar and the heat sink without structurally coupling the Dewar to the heat sink.

16. The method of claim 15, wherein the multiaxial thermal shoe couples to the heat sink via one of: a first axial surface in-line with an optical centerline or a second axial surface crosswise to the optical centerline.

17. The method of claim 15, wherein the multiaxial thermal shoe has (i) a smaller cross-sectional size in a portion of the multiaxial thermal shoe contacting the thermal interface material and (ii) a larger cross-sectional size in a portion of the multiaxial thermal shoe contacting the heat sink.

18. The method of claim 15, wherein:
the thermal interface material comprises an amorphous pliable material; and
the heat sink comprises a coldwall with fins.

19. The method of claim 15, further comprising:
operating an imaging device positioned within the Dewar.

20. The method of claim 15, wherein:
the multiaxial thermal shoe is configured to compensate for a tip/tilt or thermal expansion of one or more optics positioned proximate to the Dewar; and
the multiaxial thermal shoe includes oversized mounting holes configured to couple the multiaxial thermal shoe to the heat sink and allow for at least one plane self-alignment.

* * * * *